UNITED STATES PATENT OFFICE.

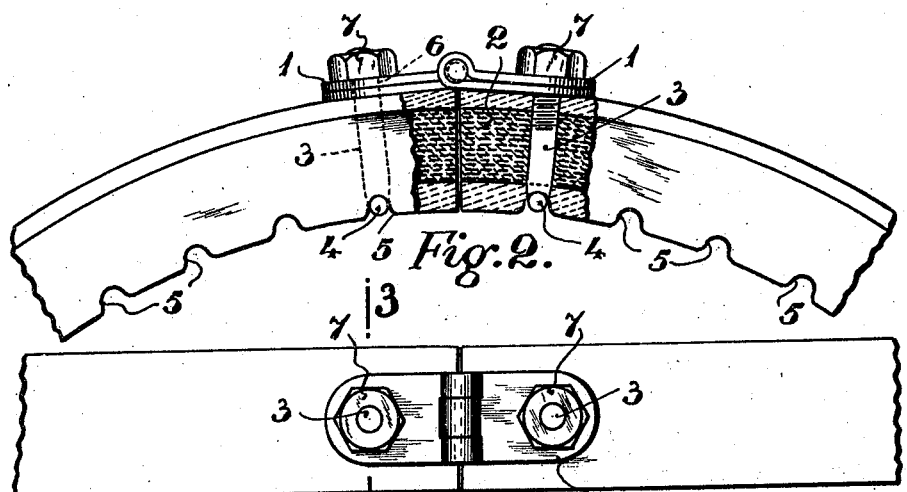
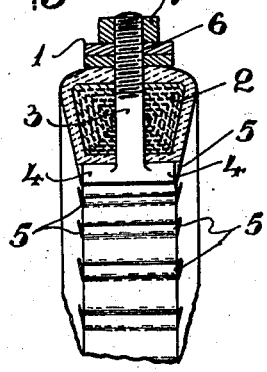

ARTHUR ANTHONY, OF ETLINGSHALL, NEAR WOLVERHAMPTON, ENGLAND.

FASTENER FOR DRIVING BELTS OF MOTOR CYCLES AND OTHER VEHICLES.

1,402,560.     Specification of Letters Patent.     Patented Jan. 3, 1922.

Application filed June 4, 1921. Serial No. 475,006.

*To all whom it may concern:*

Be it known that I, ARTHUR ANTHONY, subject of the King of Great Britain, residing at Eltingshall, near Wolverhampton, England, have invented certain new and useful Improvements in Fasteners for Driving Belts of Motor Cycles and other Vehicles, (for which I have filed application in England, November 21, 1919, Patent No. 153,782,) of which the following is a specification.

This invention relates to fasteners for the driving belts of motor cycles and other vehicles of that type comprising a plate adapted to cover the abutting ends of the belt, and which is applied to the upper face of the latter, each end of the plate being attached to the respective end of the belt by means of a clamping device, and has for its object to provide an improved construction of this type of fastener.

According to this invention, I provide a fastener of the type specified wherein the clamping device comprises a cross-bar of circular cross-section adapted to engage the usual transverse grooves upon the underside of the belt and carried by a rod adapted to be secured to the ends of the plate in any suitable manner.

Figure 1 is a front elevation of the device fitted to a belt, parts of the latter being broken away to illustrate the bolt.

Figure 2 is a plan of same.

Figure 3 is a section on the line 3—3 Figure 2.

In carrying out the invention the improved fastener consists of a substantially rectangular metal plate 1 hinged at about the middle, and adapted to cover the ends 2 of the belt which are arranged to abut against one another. The said plate is applied to the upper face of the belt and is secured to the ends of the latter by a pair of clamping bolts. Each of the said bolts is of a T-formation comprising a vertical stem 3 externally screwed at its upper end and carrying at its lower end a transverse bar 4 of circular cross-section. The stem of each of the bolts is passed vertically through the material of the belt so that the circular cross-bar engages with one of the usual transverse grooves 5 in the underside of the latter, the upper screwed end of the stem being arranged to project through a hole 6 in the respective end of the hinged plate when it is secured to the latter by means of a nut 7. By screwing up the nut the cross-bar of the bolt is drawn tightly against the underside of the belt and the latter securely clamped to the hinged plate.

Instead of a hinged plate being employed a flexible plate of thin spring metal may be used, the holes in the plate through which the ends of the clamping bolts or frames pass being formed with an annular collar or bearing to prevent undue wear caused by the plate cutting into the clamping bolts.

The transverse grooves in the underside of the belt which are engaged by the clamping bolts or frames may be fitted with a metal plate to prevent the said clamping bolts or frames cutting into the rubber.

Having fully described my invention, what I desire to claim and secure by Letters Patent is:

1. Fasteners for driving belts of the type specified comprising a plate, cross-bars of circular cross-section adapted to engage the usual transverse grooves upon the underside of the belt, rods which carry the said cross-bars and means for attaching the said rods to the respective ends of the plate.

2. Fasteners for driving belts of the type specified comprising a plate constructed of two portions hinged together, cross-bars of circular cross-section adapted to engage the usual transverse grooves upon the underside of the belt, rods which carry the said cross-bars, holes in the ends of the plate through which the respective rods pass and nuts adapted to screw on to the ends of the rods for securing the latter to the plate.

In testimony whereof I have hereunto set my hand in presence of two subscribing witnesses.

ARTHUR ANTHONY.

Witnesses:
   W. S. SKERRETT,
   RICHARD GITTINGS.